Feb. 3, 1925.

W. O. DICK 1,524,692

ANIMAL TRAP

Filed April 17, 1923  2 Sheets-Sheet 1

Witnesses:

Inventor:
Wong O. Dick
By Joshua R. Torre
His Attorney

Feb. 3, 1925.

W. O. DICK

ANIMAL TRAP 1,524,692

Filed April 17, 1923    2 Sheets-Sheet 2

Witnesses:

Inventor:
Wong O. Dick
By Joshua R. H. Horn
His Attorney.

Patented Feb. 3, 1925.

1,524,692

UNITED STATES PATENT OFFICE.

WONG O. DICK, OF CHICAGO, ILLINOIS.

ANIMAL TRAP.

Application filed April 17, 1923. Serial No. 632,623.

*To all whom it may concern:*

Be it known that I, WONG O. DICK, a citizen of the United States, and a resident of the city of Chicago, county of Cook, and State of Illinois, have invented certain new and useful Improvements in Animal Traps, of which the following is a specification.

My invention relates to improvements in animal traps and has for its principal object the provision of an improved construction of this character which will be highly efficient in use.

Among other objects of the invention is the provision of a trap including a housing having openings providing entrances to the interior thereof from different sides and having closure members for the openings which are adapted to automatically and simultaneously close.

Other objects will appear hereinafter.

The invention consists in the combinations and arrangements of parts hereinafter described and claimed.

The invention will be best understood by reference to the accompanying drawings forming a part of this specification, and in which, Fig. 1 is a top plan view of a trap embodying the invention showing the closure members of the entrances of the trap open;

In carrying out the objects of the invention I propose to provide an animal trap which includes a housing A having a bottom wall 10 of suitable material and a top wall 11 including a frame 12 carrying wire mesh work as indicated at 13. The wall 11 is supported above the bottom wall 10 by corner posts 14 having their opposite ends fixed to the walls as at 15 by welding or otherwise.

Figure 1:
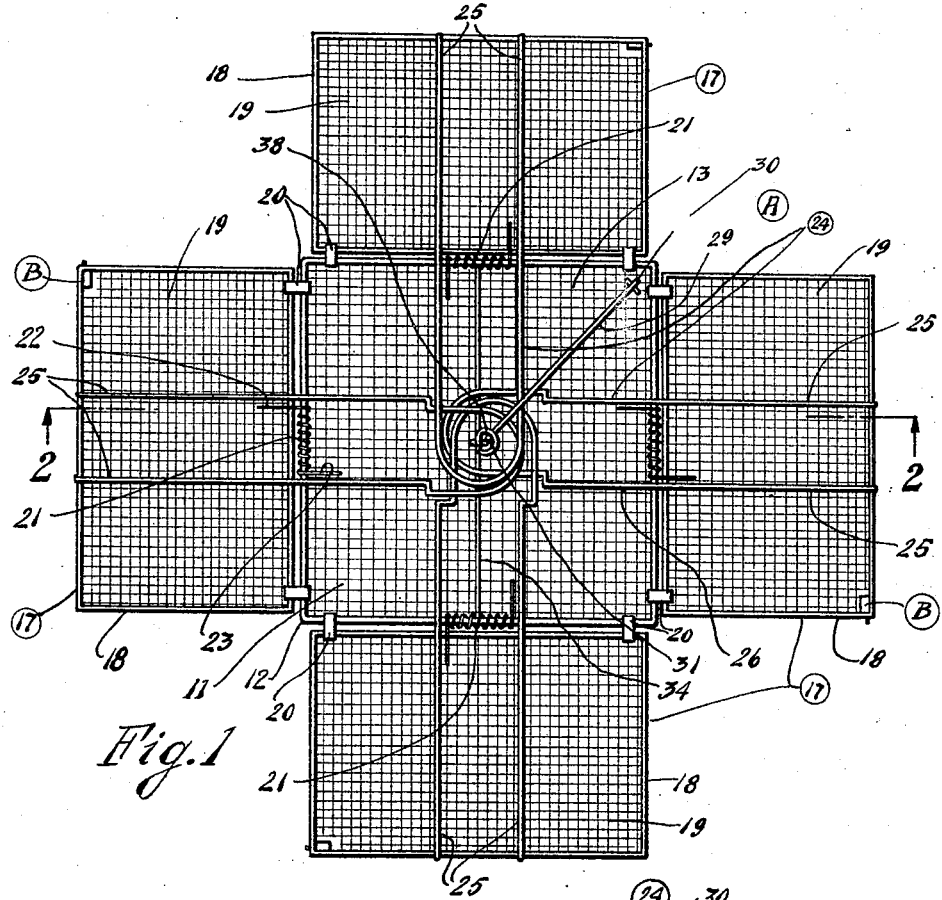

The construction as above outlined leaves the side walls of the housing A open providing entrances 16 permitting entrance to the interior of the housing from any side thereof. The entrances 16 are closed by closure members 17 each including a frame 18 carrying wire mesh work 19 and hingedly connected to the top wall 11 as at 20 by suitably constructed hinges. The closure members are adapted to automatically close under influence of spring members 21 having end portions 22 in contact with the adjacent portion of the closure members and end portions 23 in contact with the wire mesh work of the top wall, the spring members being under tension when the closure members are in open position as shown in Fig. 1. The closure members carry members indicated at 24 U-shaped in formation and having leg portions 25 extending transversely with respect to the closure members and fixed thereto by welding or otherwise and having extended portions 26 extending vertically from the top edges 27 of the closure members. The end portions 28 of the members 24 are offset relatively with respect to each other and adapted when the closure members are in open position, as illustrated in Fig. 1, to be in superposed position.

The purpose of offsetting the ends 28 of the members 24 is to prevent interlocking of the extended portions when the closure members are released for automatic closing in the manner to be hereinafter set forth.

Figure 2:
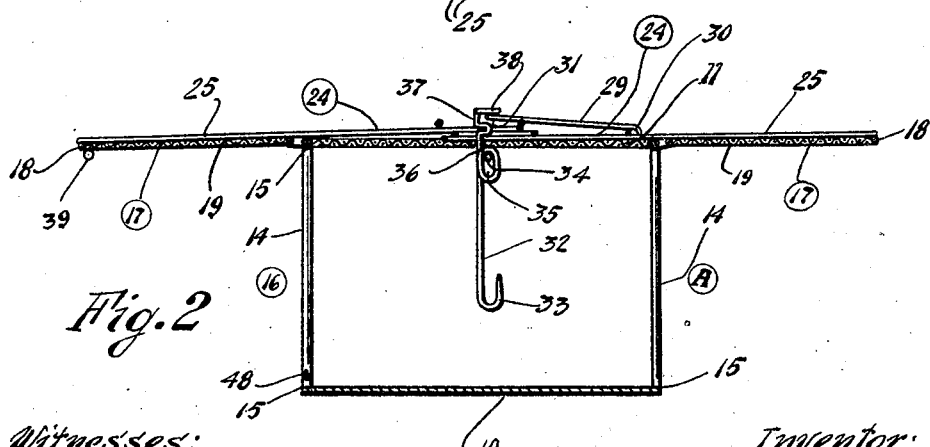
Fig. 2 is a sectional view taken substantially on line 2—2 of Fig. 1.

A trip arm 29 is provided with one end, indicated at 30 pivoted to the top wall and the other end extending in a plane above the offset portions with its end 31 releasably held by a trigger arm 32. The trigger arm 32 has a hook shaped portion 33 extending within the housing A and is pivoted to the top wall 11 as at 34. The member of the top wall 11 which serves as a pintle for the trigger arm passes through an elongated slot 35 formed by looping the trigger arm in the manner shown in Fig. 2 and indicated at 36. This construction is such that upon tampering with bait (not shown) carried by the hook shaped end of the trigger arm, the trigger arm is free to pivot in various directions. The trigger arm has a portion 37 which extends through the wall 11 and has a horizontal portion 38 formed at its outer extremity in the form of a ring, and under this ring and in engagement therewith the end 31 of the trip arm is positioned and upon a pivotal movement of the trigger arm the ring 38 is disengaged from the trip arm whereupon the closure members under influence of the spring members will automatically close.

While it is apparent from the common employment of the spring members to influence the closing of the closure members, that such spring members will also serve to hold the closure members against opening when in closed position, it is, however, my intention to provide additional locking means for locking the closure members in closed position to prevent the escape of the animal trapped as it has been often found that due to the physical strength of the trapped animal the spring members are not sufficiently strong to hold the closure members against opening.

Figure 3:
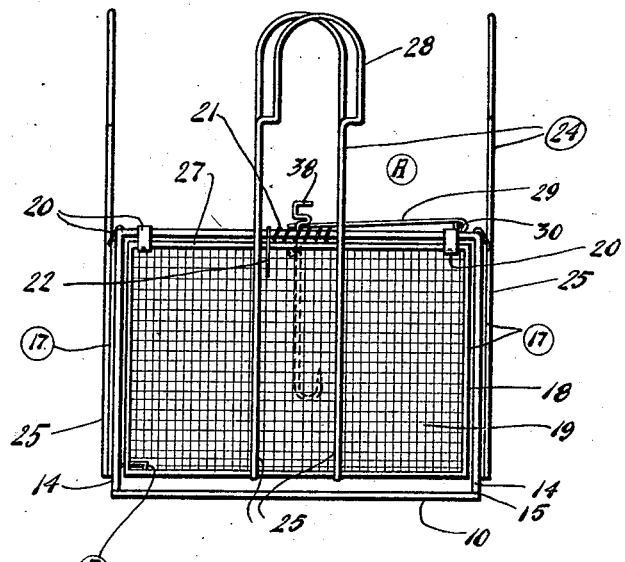
Fig. 3 is a typical side elevational view of the trap illustrated in Fig. 1, with the closure members in closed position.
Figure 4:
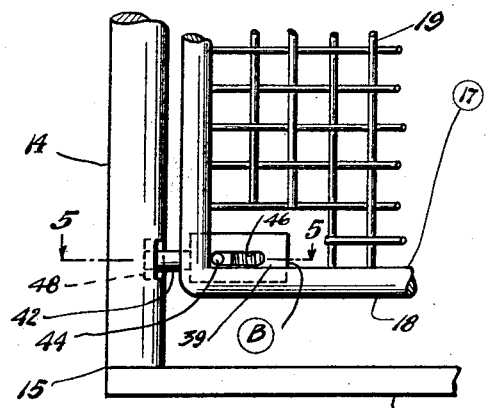
Fig. 4 is an enlarged fragmentary view of the means for locking the closure members embodied in the invention in closed position; and, Fig. 5 is a sectional view taken substantially on line 5—5 of Fig. 4.
Figure 5:
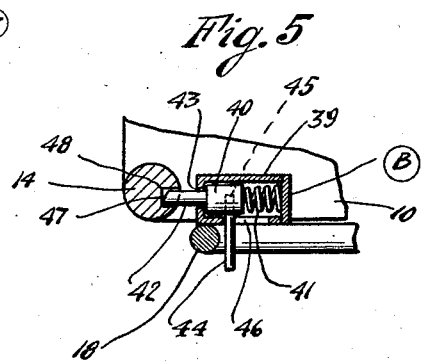

The drawings illustrate that the locking mechanism indicated at B, Fig. 3 is locked at one of the lower corners of each of the closure members, however, if desired a lock of substantially the same construction to be hereinafter set forth, can be located at both of the lower corners of each of the closure members. The locking mechanism as best illustrated in Figs. 4 and 5 includes a cylinder 39 carried by the closure member, within which is arranged a piston 40 under control of a spring member 41, arranged within the housing, and carrying a pin 42 which passes through an opening 43 formed in the cylinder 39. The piston 40 is manually manipulated by a handle 44 fixed thereto as at 45, and working in an elongated slot 46 formed in the cylinder 39. The outer end of the pin 42 is slightly bevelled as at 47 and is adapted, when the closure member with which the lock is associated is in closed position, to pass into a notched out portion 48 formed in the adjacent corner post 14. It will be seen from the construction of the locking mechanism that upon the closing of the closure member with which the locking mechanism is associated the pin will automatically pass into the notched portion 48 and hold the closure member against opening.

While I am aware that there are various types of animal traps now in commercial use there are none having the provision of permitting entrance to the interior of the trap from different directions and having these entrances closed by self-closing closure members which simultaneously close upon being released by the mechanism which releasably holds the closure members against closing. The construction of the trap as embodied in my invention can be manufactured at an economical cost and be made in various sizes.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent, is:

1. A structure of the class described including a housing having an opening on every side, a closure member for each opening, members carried by the closure members and having looped portions projecting above the top edges thereof, said portions arranged to prevent interlocking and adapted when the closure members are in open position to be superposed above the top wall of the housing, a member engaging over said upper portions when superposed above the top wall, a member having a portion extending into the housing and co-operating with the last named member for releasably mounting the closure members in open position, and means for locking the closure members in closed position.

2. A structure of the class described including a housing having openings permitting entrance thereto from different sides thereof, self-closing closure members for the openings, members carried by the closure members and having looped portions extending above the top edges thereof and adapted to be superposed when the closure members are in open position, several of said looped portions being offset to prevent interlocking thereof, a member pivotally carried by the housing and having an end extending over the upper ends of the members when the closure members are in open position, and a trigger arm having a portion extending into the housing and provided with a ring portion cooperating with the pivotally mounted member for releasably holding the closure members in open position, said closure members being adapted to simultaneously close upon release.

3. A structure of the class described including a housing having openings permitting entrance thereto from different sides thereof, self-closing closure members for the openings, members carried by the closure members and having portions extending above the top edges thereof and adapted when the closure members are in open position to be in a plane above the top wall of the housing, a tripping rod pivotally carried by the housing and having an end extending over the upper ends of the members when the closure members are in open position, a trigger member having a portion extending into the housing and provided with a ring portion cooperating with the pivotally mounted rod for releasably holding the closure members in open position, said closure members being adapted to simultaneously close upon release, and a spring-pressed plunger on each closure member for locking the closure members in closed position.

4. A structure of the class described including a housing having openings permitting entrance thereto from different sides thereof, closure members for the openings, members substantially U-shaped in form carried by the closure members and having portions extending above the top edges thereof and adapted to be arranged in superposed position when the closure members are in open position, a member pivotally carried by the housing and having an end extending over the upper ends of the members when the closure members are in open position, and a trigger arm having a portion extending into the housing and provided with a ring portion cooperating with the pivotally mounted member for releasably holding the closure members in open position.

5. A structure of the class described including a housing having openings permitting entrance thereto from different sides thereof, closure members for the openings, members substantially U-shaped in form carried by the closure members and having portions extending above the top edges thereof and adapted to be arranged in superposed position when the closure members are in open position, a member pivotally carried by the housing and having an end extending over the upper ends of the members when the closure members are in open position, a trigger arm having a portion extending into the housing and provided with a ring portion cooperating with the pivotally mounted member for releasably holding the closure members in open position, and means for locking the closure members in closed position.

In testimony whereof I have signed my name to this specification in the presence of two subscribing witnesses.

WONG O. DICK.

Witnesses:
    JOSHUA R. H. POTTS,
    MARGARET AUER.